(12) United States Patent
Fernandes et al.

(10) Patent No.: US 12,249,351 B1
(45) Date of Patent: Mar. 11, 2025

(54) VIDEO EDITS USING SALIENCY

(71) Applicant: GoPro, Inc., San Mateo, CA (US)

(72) Inventors: Cedric Fernandes, San Ramon, CA (US); Xiao Liu, Portola Valley, CA (US); Rahul Iyengar, Union City, CA (US); Balaji Doraibabu, Shrewsbury, MA (US)

(73) Assignee: GoPro, Inc., San Mateo, CA (US)

( * ) Notice: Subject to any disclaimer, the term of this patent is extended or adjusted under 35 U.S.C. 154(b) by 112 days.

(21) Appl. No.: 18/317,628

(22) Filed: May 15, 2023

(51) Int. Cl.
*G11B 27/00* (2006.01)
*G06T 7/11* (2017.01)
*G06V 20/40* (2022.01)
*G11B 27/02* (2006.01)
*G11B 27/031* (2006.01)

(52) U.S. Cl.
CPC ............. *G11B 27/031* (2013.01); *G06T 7/11* (2017.01); *G06V 20/49* (2022.01); *G06T 2207/10016* (2013.01); *G06T 2207/20164* (2013.01)

(58) Field of Classification Search
CPC ....... G11B 27/00; G11B 27/02; G11B 27/031; G06T 7/11; G06T 2207/20164; G06V 20/49
USPC ................................ 386/278, 280, 282, 239
See application file for complete search history.

(56) References Cited

U.S. PATENT DOCUMENTS 9,589,595 B2 * 3/2017 Gao .......................... G06T 7/75

\* cited by examiner

*Primary Examiner* — Daquan Zhao
(74) *Attorney, Agent, or Firm* — ESPLIN & ASSOCIATES, PC

(57) ABSTRACT

Salient regions within video frames of a video may be identified. Sizes of salient regions within video frames may be determined and used to identify saliency frames in the video. Salient segments of the video may be identified using the saliency fames in the video. The salient segments of the video may be used to generate a video edit.

20 Claims, 5 Drawing Sheets

VIDEO EDITS USING SALIENCY

FIELD

This disclosure relates to identification of video segments for inclusion in a video edit using sizes of salient regions in video frames.

BACKGROUND

A video may include segments that depict interesting things and segments that do not depict interesting things. Automatic edits of the video may result in a video edit including segments of the video that do not depict interesting things or not including segments of the video that do depict interesting things.

SUMMARY

This disclosure relates to editing videos using saliency. Video information and/or other information may be obtained. The video information may define a video. The video may have a progress length. The video may include video frames. Salient regions within the video frames may be identified. Sizes of the salient regions within the video frames may be determined. Salient segments within the progress length of the video may be identified based on the sizes of the salient regions within the video frames and/or other information. A video edit may be generated based on the salient segments within the progress length of the video and/or other information.

A system for editing videos using saliency may include one or more electronic storage, processor, and/or other components. The electronic storage may store video information, information relating to a video, information relating to video frames, information relating to salient regions, information relating to sizes of salient regions, information relating to salient segments, information relating to video edits, and/or other information.

The processor(s) may be configured by machine-readable instructions. Executing the machine-readable instructions may cause the processor(s) to facilitate editing videos using saliency. The machine-readable instructions may include one or more computer program components. The computer program components may include one or more of a video component, a salient region component, a size component, a salient segment component, a video edit component, and/or other computer program components.

The video component may be configured to obtain video information and/or other information. The video information may define a video. The video may have a progress length. The video may include video frames.

The salient region component may be configured to identify salient regions within the video frames. The salient regions within the video frames may be identified based on analysis of the video frames and/or other information. In some implementations, identification of the salient regions within the video frames may not be performed for one or more of the video frames based on blurriness and/or shakiness of the video frame(s).

The size component may be configured to determine sizes of the salient regions within the video frames. The sizes of the salient regions within the video frames may be determined based on analysis of the video frames, analysis of the salient regions, and/or other information.

The salient segment component may be configured to identify salient segments within the progress length of the video. The salient segments within the progress length of the video may be identified based on the sizes of the salient regions within the video frames and/or other information.

In some implementations, identification of the salient segments within the progress length of the video based on the sizes of the salient regions within the video frames may include: identification of saliency frames among the video frames based on the sizes of the salient regions within the saliency frames satisfying a saliency criterion and/or other information; and identification of the salient segments within the progress length of the video based on the saliency frames and/or other information.

In some implementations, the saliency criterion may be satisfied based on the sizes of the salient regions within the saliency frames covering a threshold percentage of the saliency video frames. In some implementations, a given salient segment within the progress length of the video may be identified based on inclusion of a threshold number of the saliency frames within the given salient segment. In some implementations, the given salient segment within the progress length of the video may be identified further based on the saliency frames within the given salient segment being sequential video frame. In some implementations, the given salient segment within the progress length of the video may be identified to include a first buffer before the saliency frames and/or a second buffer after the saliency frames.

In some implementations, a saliency score for the video may be determined based on a number of the saliency frames identified within the video, a number of video frames within the video, and/or other information.

The video edit component may be configured to generate a video edit of the video. The video edit of the video may be generated based on the salient segments within the progress length of the video and/or other information. In some implementations, the video edit may be generated based on the salient segments within the progress length of the video based on the saliency score for the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
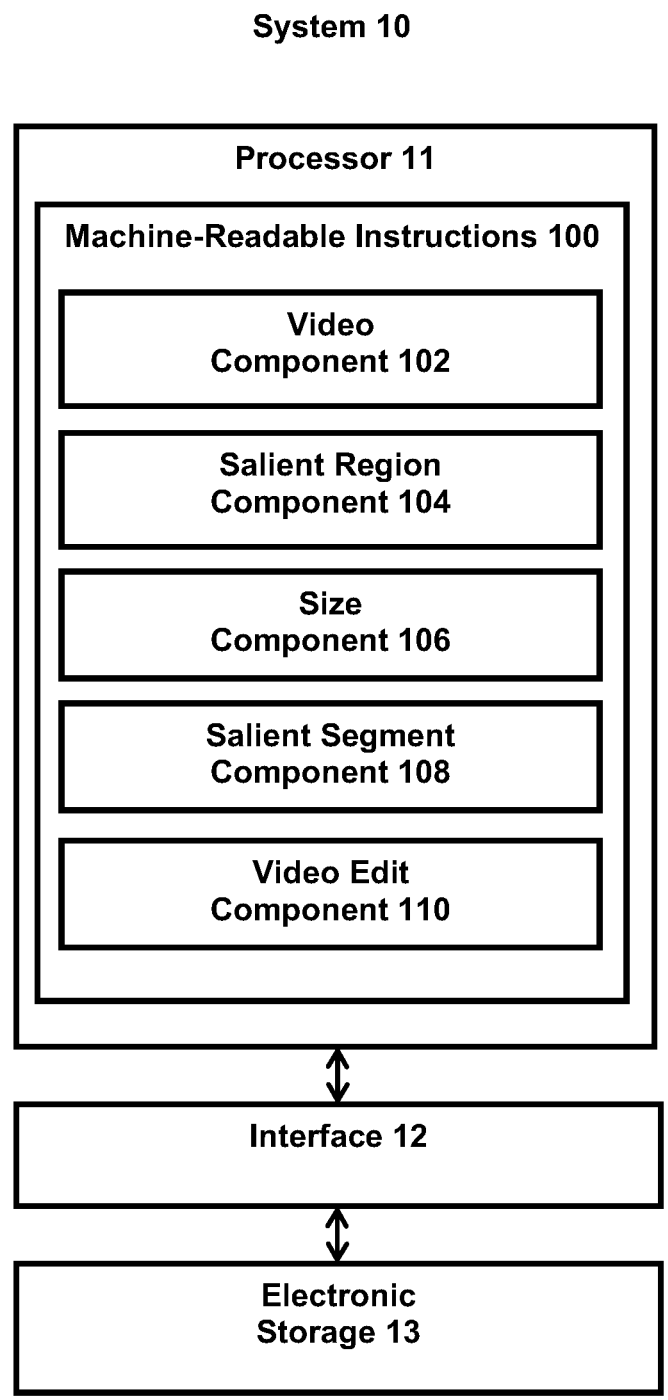
FIG. 1 illustrates a system for editing videos using saliency.

FIG. 1 illustrates a system 10 for editing videos using saliency. The system 10 may include one or more of a processor 11, an interface 12 (e.g., bus, wireless interface), an electronic storage 13, and/or other components. Video information and/or other information may be obtained by the processor 11. The video information may define a video. The video may have a progress length. The video may include video frames. Salient regions within the video frames may be identified by the processor 11. Sizes of the salient regions within the video frames may be determined by the processor 11. Salient segments within the progress length of the video may be identified by the processor 11 based on the sizes of the salient regions within the video frames and/or other information. A video edit may be generated by the processor 11 based on the salient segments within the progress length of the video and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to video frames, information relating to salient regions, information relating to sizes of salient regions, information relating to salient segments, information relating to video edits, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

A video edit may be generated from one or more videos. A video edit may include segments of one or more videos. For example, segments of a video may be identified for inclusion in a video edit, and the visual content and/or the audio content of video from the identified segments may be used (e.g., included in the video with/without alteration) to create the video edit. For example, highlight moments (e.g., moments of interest, moments of activity) within a video may be identified and segments of the video that include highlight moments may be identified for inclusion in a video edit.

Inaccurate identification of highlight moments in a video may result in the video edit including non-interesting segments of the video and/or not including interesting segments of the video. For example, segments of the video that include blurry/shaky footage and/or dead/boring footage may be inaccurately identified for inclusion in the video edit. Segments of the video that include exciting/interesting footage may not be identified for inclusion in the video edit.

The present disclosure provides improvements to automated video edit generation by using sizes of salient region in video frames to identify segments of a video for inclusion in a video edit. Video frames with salient regions taking up more than a threshold extent of the video frames (e.g., more than 2.5% of the pixels of the video frames depict salient objects) may be identified as saliency frames, and the segments of the video including the saliency frames may be identified for inclusion in the video edit. Such identification of the video segments for inclusion in the video edit may increase the likelihood of the video edit including interesting footage from the video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate editing videos using saliency. The machine-readable instructions 100 may include one or more computer program components. The machine-readable instructions 100 may include one or more of a video component 102, a salient region component 104, a size component 106, a salient segment component 108, a video edit component 110, and/or other computer program components.

The video component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video component 102 may obtain video information from one or more locations. For example, the video component 102 may obtain video information from a storage location, such as the electronic storage 13, electronic storage of information and/or signals generated by one or more sensors, electronic storage of a device accessible via a network, and/or other locations. The video component 102 may obtain video information from one or more hardware components (e.g., an image sensor) and/or one or more software components (e.g., software running on a computing device).

In some implementations, the video component 102 may obtain video information based on user interaction with a user interface/application (e.g., video editing application, video player application), and/or other information. For example, a user interface/application may provide option(s) for a user to generate a video edit. The video information defining a video may be obtained based on the user's selection of the video through the user interface/video application for use in generating the video edit. Other selections of video for retrieval of video information are contemplated.

The video information may define a video. The video may have a progress length (e.g., duration). The video may include visual content, audio content, and/or other content. The video may include visual content, audio content, and/or other content viewable/playable as a function of progress through the progress length. The video may include video frames. The video frames may include/depict the visual content of the video.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content and/or other content of the video. Other types of video information are contemplated.

The visual content of the video may have a field of view. The field of view of the visual content may refer to a portion of a scene that was observed by one or more image capture devices in capturing the visual content. The field of view may refer to the extent (e.g., angle, size) of a scene that is captured within the visual content. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects).

In some implementations, the video may include a spherical video. The field of view of the visual content of a spherical video may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The salient region component 104 may be configured to identify salient regions within video frames of a video. Identifying a salient region within a video frame may include ascertaining, detecting, determining, establishing, finding, indicating, locating, obtaining, and/or otherwise identifying the salient region within the video frame. The salient region component 104 may be configured to identify salient regions within different video frames of the video. A salient region may refer to a spatial region (extent, portion, part) of a video frame that depicts one or more salient objects/objects of interest. A salient region may refer to a spatial region of a video frame on which a person's eyes are likely to focus.

The salient regions within the video frames may be identified based on analysis of the video frames and/or other information. Analysis of visual content may include analysis of the content of the video frames of the video, such as analysis of the arrangement of pixels, characteristics of pixels, values of pixels, and/or other aspects of pixels of the visual content. Analysis of visual content may include use of computer vision, saliency detection, and/or other object detection, recognition, and/or segmentation techniques to identify salient region within the video frames. Other identification of salient regions within video frames is contemplated.

For example, one or more deep learning models (e.g., Unified Framework for Co-Object Segmentation) may be used to identify salient regions within video frames. Image features and/or statistics may be utilized to localize interesting/foreground regions within the video frames.

In some implementations, analysis of the video frames for salient region identification (salient region analysis) may be performed locally within the system 10. In some implementations, salient region analysis may be performed remotely from the system 10. For example, GPU clusters in the cloud may be utilized to deploy one or more deep learning models for identifying salient regions. The video frames may be uploaded to the cloud for analysis, and the identification of salient regions on the cloud may be obtained.

In some implementations, identification of salient regions within a video frame may include generation of a saliency map for the video frame. A saliency map may refer to an image that indicates saliency of things depicted within the video frame using pixel values. For example, regions in a saliency map corresponding to salient regions within a video frame may be characterized by different (e.g., higher) levels of pixel values in a saliency map than regions in the saliency map corresponding to non-salient regions within the video frame. For example, a saliency map may highlight salient regions (e.g., as distinct objects/people, as foreground) while suppressing non-salient regions (e.g., as background) in the video frame. For instance, a saliency map may include a greyscale image with light pixels for salient regions and dark pixels for non-salient regions, or vice versa. A pixel threshold value may be used to separate pixels depicting salient regions from pixels depicting non-salient regions. For example, pixels having pixel values higher than the pixel threshold value may be identified as pixels depicting salient regions while pixels having pixel values lower than the pixel threshold value may be identified as pixels depicting non-salient regions, or vice versa.

In some implementations, a deep learning model may output a two-dimensional array with values ranging between zero and one, with zero representing minimum saliency and one representing maximum saliency. The two dimensional array may be converted into a saliency map by multiplying the values of the array with a particular number. For example, a saliency map may be generated by multiplying the values of the array with 255 so that pixel value of 255 represents maximum saliency. Use of other values and other generations of saliency map are contemplated.

Figure 3:
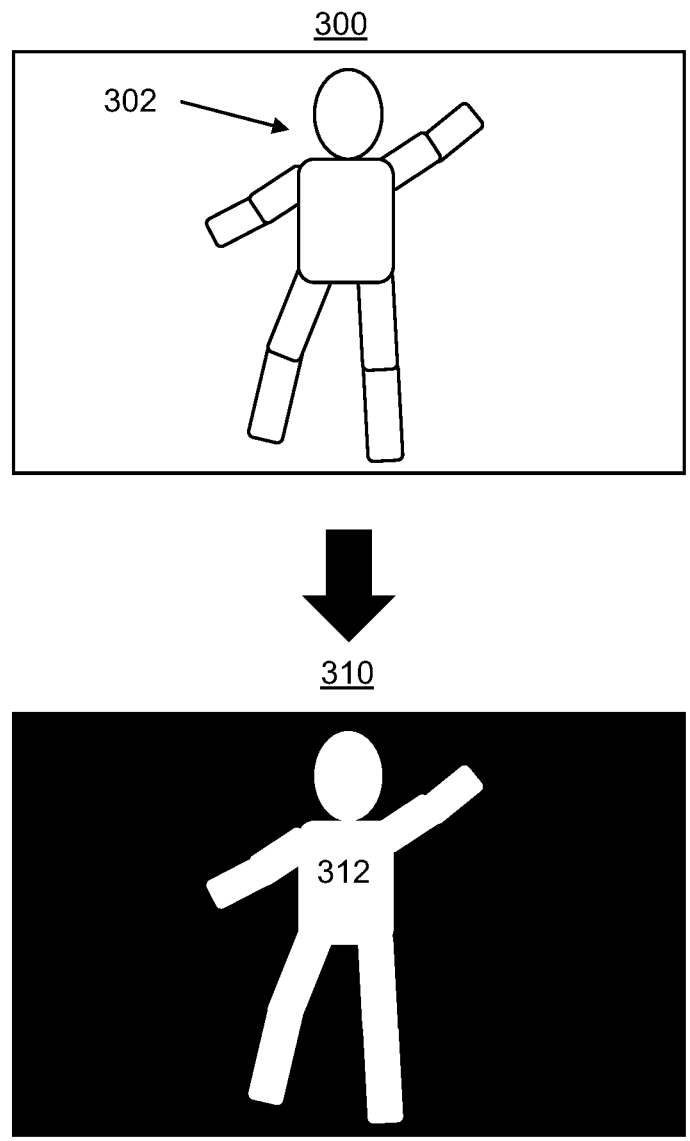
FIG. 3 illustrates an example identification of salient region within a video frame.

FIG. 3 illustrates an example identification of salient region within a video frame 300. The video frame 300 may include depiction of a person 302. The video frame 300 may include depiction of other things. A saliency map 310 may be generated for the video frame 300. The saliency map 310 may indicate salient regions and non-salient regions within the video frame 300 using pixel values. For example, the saliency map 310 may include a salient region 312. The salient region 312 may be characterized by higher pixel values than other regions of the saliency map 300.

In some implementations, salient regions may be identified within all video frames of a video. For example, visual content of every video frames in the video may be analyzed to identify salient regions within individual video frames.

In some implementations, salient regions may be identified within some but not all video frames of a video. For example, a subset of the video frames of the video may be selected for salient region analysis. For instance, the video frames may be sampled (e.g., every $4^{th}$ frame, every $10^{th}$ frame, four frames per second, 10 frames per second), and salient regions may be identified within the sampled video frames. The results of salient region analysis for a sample video frame may be applied to nearby/adjacent video frame (e.g., preceding and/or subsequent video frames).

As another example, a subset of the video frames of the video may be excluded from salient region analysis. For instance, identification of the salient regions within the video frames may not be performed for one or more video frames based on blurriness and/or shakiness of the video frame(s). Before salient region analysis is performed, video frames may be analyzed to determine blurriness and/or shakiness in the video frames. Video frames with a certain amount of blurriness and/or shakiness may be excluded from salient region analysis. In some implementations, visual content of the video frames may be analyzed to determine blurriness and/or shakiness in the video frames. In some implementations, metadata relating to the capture of the video frames (e.g., image capture device position/movement during capture of the video frames, exposure setting used to capture the video frames) may be analyzed to determine blurriness and/or shakiness in the video frames.

The size component 106 may be configured to determine sizes of the salient regions within the video frames. Determining size of a salient region within a video frame may include ascertaining, approximating, calculating, estimating, finding, identifying, obtaining, quantifying, and/or otherwise determining the size of the salient region within the video frame. The size component 106 may be configured to determine sizes of salient regions within different video frames of the video. Size of a salient region may refer to relative extent of the salient region within the video frame, overall dimensions and/or magnitude of the salient region, and/or how big the salient region is within the video frame. For example, size of a salient region within a video frame may refer to the number of pixels that depict the salient region within the video frame (e.g., number of pixels that make up the salient region within the video frame).

The sizes of the salient regions within the video frames may be determined based on analysis of the video frames, analysis of the salient regions, and/or other information. Analysis of a video frame may include analysis of the visual content within the video frame. Analysis of a salient region may include analysis of the visual content within the salient region. Analysis of a video frame and/or a salient region within the video frame may include determination of how much of the video frame is taken up by the salient region. For example, determination of the size of the salient region within the video frame may include calculating the percentage of the video frame that is taken up by the salient region and/or counting the number of pixels of the video frame that depict the salient region.

In some implementations, sizes of salient regions within video frames may be determined using one or more saliency maps. For example, referring to FIG. 3, sizes of salient regions within the video frame 300 may be determined by calculating the percentage of the saliency map 310 taken up by the salient region 312 and/or counting the number of pixels of the saliency map 310 that depict the salient region 312. Other determination of sizes of salient regions within video frames is contemplated.

The salient segment component 108 may be configured to identify salient segments within the progress length of the video. Identifying a salient segment within the progress length of the video may include ascertaining, detecting, determining, establishing, finding, indicating, locating, obtaining, and/or otherwise identifying the salient segment within the progress length of the video. Identifying a salient segment within the progress length of the video may include identifying the beginning, the middle, the end, and/or other characteristics of the salient segment. A salient segment may refer to a temporal segment of the progress length (e.g., duration) of the video that include video frames that depict salient objects. A salient segment may refer to a temporal segment of the progress length of the video to be included (potentially included, definitely included) within a video edit.

The salient segments within the progress length of the video may be identified based on the sizes of the salient regions within the video frames and/or other information. The sizes of the salient regions within the video frames may be used as an indicator/score to determine whether the video frames should be selected for inclusion (e.g., potential inclusion, definite inclusion) in a video edit. The size of the salient regions within the video frame may be used as a metric to indicate whether the video frame depicts meaningful/distinct object(s) for inclusion in a video edit.

For example, the percentage of a video frame that is taken up by a salient region and/or the number of pixels of the video frame that depict the salient region may be used to identify salient segments within the progress length of the video. The percentage of a video frame that is taken up by a salient region and/or the number of pixels of the video frame that depict the salient region may be used to determine whether the video frame should be selected for inclusion in a video edit.

In some implementations, identification of the salient segments within the progress length of the video based on the sizes of the salient regions within the video frames may include: identification of saliency frames among the video frames based on the sizes of the salient regions within the saliency frames satisfying a saliency criterion and/or other information; and identification of the salient segments within the progress length of the video based on the saliency frames and/or other information.

A saliency frame may refer to a video frame with sufficient salient region. A saliency frame may refer to a video frame that depicts meaningful/distinct object(s). A saliency criterion may refer to one or more standards, factors, and/or principles by which salient sufficiency of a video frame is analyzed, judged, measured, and/or otherwise decided on for inclusion in a video edit. A saliency criterion may provide one or more standards, factors, and/or principles relating to size of salient region to determine whether the video frame is a saliency frame or not. A saliency criterion may define a size threshold to which sizes of salient regions in the video frames are compared. A saliency criterion may be satisfied for a video frame based on size(s) of the salient region(s) within the video frame meeting, being the same as, exceeding, and/or otherwise satisfying the saliency criterion.

In some implementations, a saliency criterion may be satisfied based on the sizes of the salient regions within the saliency frames covering a threshold percentage of the saliency video frames. For example, a saliency criterion may require a certain percentage of a video frame to be taken up by salient region(s) for the video frame to quality as a saliency frame. For instance, a saliency criterion may require at least 2.5% of a video frame to be taken up by salient region(s) for the video frame to quality as a saliency frame.

In some implementations, a saliency criterion may be satisfied based on the salient regions within the saliency frames being depicted by a threshold number of pixels. For example, a saliency criterion may require a certain number of pixels of the video frame to depict salient region(s) for the video frame to quality as a saliency frame. The number of pixels required by the saliency criterion may depend on the resolution of the video frame.

In some implementations, a saliency criterion may require different percentages/number of pixels for a video frame to be a saliency frame. For example, a saliency criterion may require one percentage of a video frame to be taken up by a single salient region for the video frame to quality as a saliency frame while requiring another percentage of the video frame to be taken up by multiple salient regions for the video frame to quality as a saliency frame. A saliency criterion may require a certain number of pixels of the video frame to depict a single salient region for the video frame to quality as a saliency frame while requiring another number of pixels of the video frame to depict multiple salient regions for the video frame to quality as a saliency frame. Other saliency criteria are contemplated.

The saliency frames within the video may be used to identify the salient segments within the progress length of the video. The location, number, and/or other characteristics of the saliency frames within the video may be used to identify the salient segments within the progress length of the video. For example, a segment of the video may be identified as a salient segment based on the segment of the video including at least a certain number of saliency frames. A segment within the progress length of the video may be identified as a salient segment based on inclusion of a threshold number of saliency frames within the segment. A segment that has the same number as or more than the threshold number of saliency frames may be identified as a salient segment.

In some implementations, a segment of the video may be identified as a salient segment further based on the saliency frames being sequential video frames. For example, a segment of the video may be identified as a salient segment based on the segment of the video including at least a certain number of sequential saliency frames. A segment within the progress length of the video may be identified as a salient segment further based on the saliency frames within the segment being sequential video frame.

In some implementations, one or more buffers may be added to a salient segment. A buffer may be added to the salient segment to lengthen the salient segment. For example, a salient segment may be identified within the progress length of the video to include a buffer before the saliency frames and/or a buffer after the saliency frames. The visual content and/or audio content within the buffer(s)

may provide context for the visual content within the saliency frames and/or the audio content associated with the saliency frames. In some implementations, the duration of the buffers before and after the saliency frames may be the same (e.g., both 3 seconds). In some implementations, the durations of the buffers before and after the saliency frames may be different.

Figure 4:
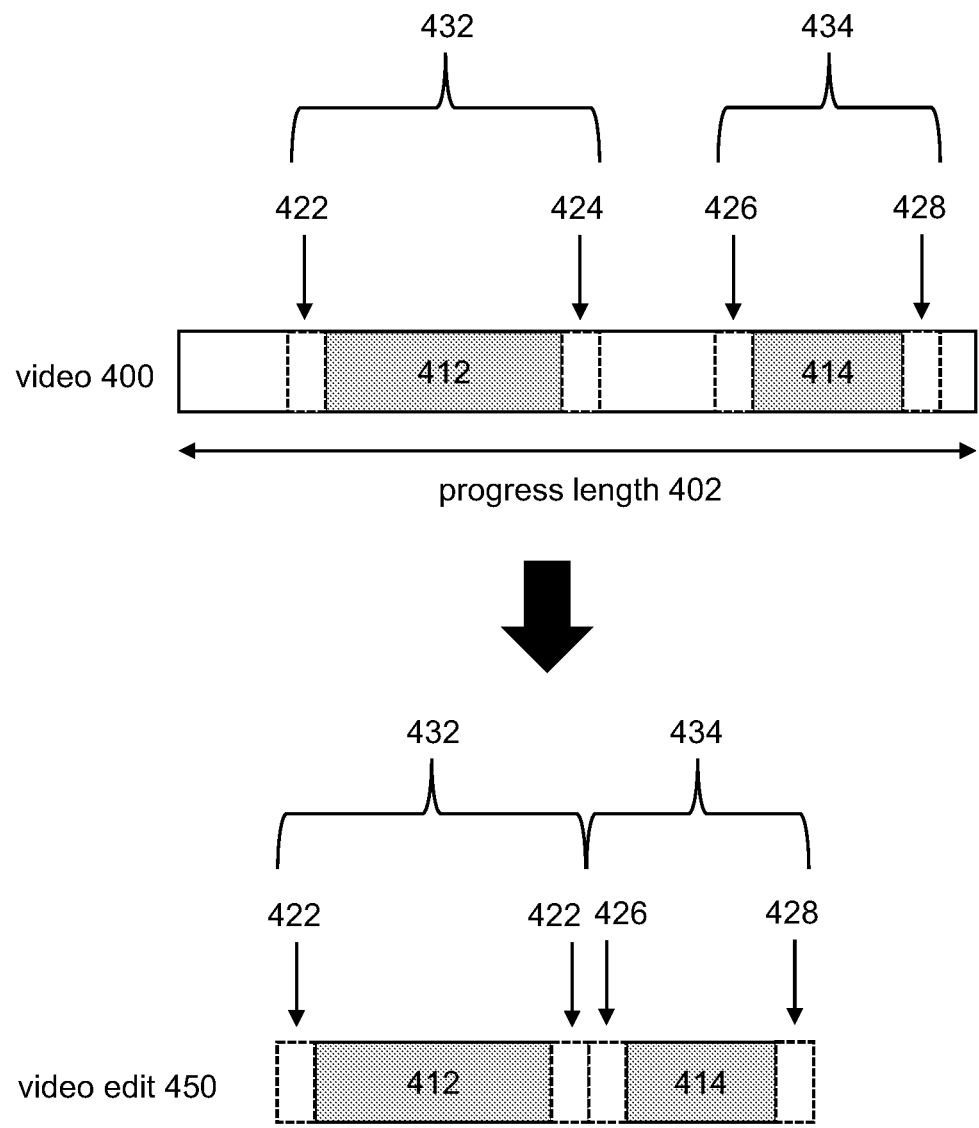
FIG. 4 illustrates an example identification of salient segments within a video for inclusion in a video edit.

FIG. 4 illustrates an example identification of salient segments within a video for inclusion in a video edit. A video 400 may have a progress length 402. The video 400 may include saliency frames 412, 414. A salient segment 432 may be identified to include a buffer 422, the saliency frames 412, and a buffer 424. A salient segment 434 may be identified to include a buffer 426, the saliency frames 414, and a buffer 428. Other identification of salient segments is contemplated.

In some implementations, a saliency score for a video may be determined based on a number of saliency frames identified within the video, a number of video frames within the video, and/or other information. For example, a saliency score for the video may be calculated as/using the number of saliency frames divided by the total number of video frames in the video. The saliency score for the video may be used to determine whether the video will be used in generating a video edit. For example, multiple videos may be obtained, and saliency scores for the videos may be determined using the number of saliency frames in the videos and the total number of video frames in the videos. Which of the videos will be used in generating the video edit may be determined based on the saliency scores for the videos. For example, videos with highest saliency scores (e.g., a certain number of videos with highest saliency scores) may be used in generating a video edit. As another example, videos with saliency scores equal to or higher than a saliency score threshold may be used in generating the video edit.

In some implementations, the salient segments within the progress length of the video may be identified based on other information about the video. For example, metadata for a video may be used to identify the salient segments. Metadata for a video may refer to a set of data that describes and/or gives information about the video. Metadata for a video may include information relating to capture of the video (e.g., velocity data, acceleration data, magnetometer data, location data of an image capture device during capture of the video), information relating to content captured within the video (e.g., results of object detection, scene detection, and/or activity detection), and/or other information relating to the video.

The metadata for the video may be used separately and/or in conjunction with the sizes of the salient regions to identify the salient segments. For example, metadata for a video may be used as an overlay to the saliency map to better identify salient segments within the video. For example, information on image capture device movement (e.g., velocity, acceleration, lateral g-force) may provide another way of identifying salient segments within the video, and use of both image capture device moment and sizes of salient regions may enable better identification of salient segments. For instance, salient segments identified based on inclusion saliency frames and having certain image capture device movement may result in identification of those video portions that include depiction of interesting things and interesting movement.

In some implementations, one or more long short-term memory (LSTM) networks may be used to the salient segments within the progress length of the video. The LSTM network(s) may help to identify content captured within the video (e.g., activity captured within the video) and the information on the content captured within the video may be used to identify salient segments within the video. For example, information on content captured within the video may be used to modify how saliency is assessed and/or change thresholds used for saliency identification/video edit generation.

The video edit component 110 may be configured to generate one or more video edits. The video edit component 110 may be configured to generate one or more video edits of a video. A video edit may refer to a particular arrangement and/or manipulation of one or more segments of one or more videos. A video edit may include visual content, audio content, and/or other content of one or more videos. A video edit may include one or more unmodified segments of the video(s) and/or one or more modified segments of the video(s) (e.g., modified via applying of visual effects, audio effects, temporal effects). A video edit of a video may refer to a video edit generated based on one or more segments of the video. A video edit of a video may include one or more unmodified segments of the video and/or one or more modified segments of the video. A video edit of a video may include segments of other videos.

A video edit may be generated based on the salient segments within the progress length of the video and/or other information. A video edit may be generated to include the salient segments that were identified within the video. For example, referring to FIG. 4, a video edit 450 may be generated based on the salient segments 432, 434 identified within the video 400. The video edit 450 may include the salient segment 432 (including the buffer 422, the saliency frames 412, and the buffer 424) and the salient segment 434 (including the buffer 426, the saliency frames 414, and the buffer 428). The beginnings of salient segments may be used as cut in points and endings of the salient segments may be used as cut out points for the video edit. The beginnings and/or endings of the salient segments may be used as transition points within the video edit.

Generation of a video edit based on salient segments may include use of some or all of the salient segments in the video edit. In some implementations, all of the salient segments identified within a video may be included in the video edit. For instance, the salient segments may be identified for definite inclusion in a video edit. In some implementations, some but not all of the salient segments identified within a video may be included in the video edit. For instance, the salient segments may be identified for potential inclusion in a video edit.

For example, the salient segments may be provided to a video edit engine. The video edit engine may utilize one or more video editing rules to generate the video edit. Whether the salient segments are actually included in the video edit may depend on the video editing rule(s) used by the video edit engine. For example, the video edit engine may identify/obtain highlight moments within videos and use the highlight moments as one of the factors in generating a video edit. Salient segments identified within a video may be provided to the video edit engine as highlight moments within the video, and the video edit engine may treat the salient segments like other highlight moments for video edit generation.

Other information about videos may be used to generate the video edit. For example, metadata for the videos (e.g., velocity data, acceleration data, magnetometer data, location data) and/or analysis of the videos (e.g., object detection, scene detection, activity detection) may be used to generate the video edit.

In some implementations, a video edit may be generated based on salient segments within a progress length of a video based on the saliency score for the video and/or other information. Whether salient segments in a video are used in generating a video edit may be determined based on the saliency score for the video. For example, if the video has one of the highest saliency score among candidate videos for the video edit, then the salient segments in the video may be used in generating the video edit. If the video has one of the lowest saliency score among candidate videos for the video edit, then the salient segments in the video may not be used in generating the video edit. If the saliency score of the video is equal to or higher than a saliency score threshold for the video edit, then the salient segments in the video may be used in generating the video edit. If the saliency score of the video is lower than a saliency score threshold for the video edit, then the salient segments in the video may not be used in generating the video edit.

A video edit may be generated as an encoded video edit and/or instructions for rendering the video edit. For example, the video edit may be generated as an encoded version of a particular video clip, and the video clip may be opened in a video player for presentation. The video edit may be generated as instructions for presenting video content, such as instructions identifying arrangements and/or manipulations of one or more segments of video(s) included in the video edit. For example, the video edit may be generated as information defining a director track that includes information as to which segments of video(s) are included in the video edit, the order in which the segments are to the presented on playback, and the edits to be applied to the different segments. A video player may use the director track to retrieve the segments of the video(s) identified in the video edit for presentation, arrangement, and/or editing when the video edit is opened/to be presented.

Video edit information defining a video edit (e.g., encoded video edit, director track) may be stored in one or more storage media. For example, the video edit information may be stored in the electronic storage 13, remote storage locations (storage media located at/accessible through a server), and/or other locations. In some implementations, the video edit information may be stored through one or more intermediary devices. For example, the processor 11 may be located within a computing device without a connection to the storage device (e.g., the computing device lacks WiFi/cellular connection to the storage device). The video edit information may be stored through another device that has the necessary connection (e.g., the computing device using a WiFi/cellular connection of a paired mobile device, such as a smartphone, tablet, laptop, to store information in one or more storage media). Other storage locations for and storage of the video edit information are contemplated.

Figure 5:
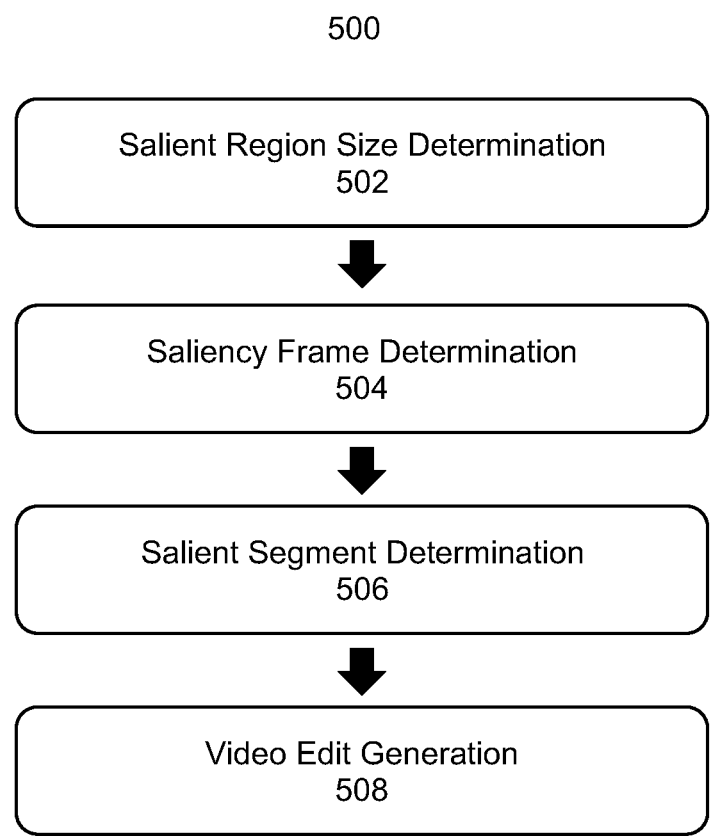
FIG. 5 illustrates an example process for using sizes of salient regions within video frames for video edit generation.

FIG. 5 illustrates an example process 500 for using sizes of salient regions within video frames for video edit generation. At step 502, sizes of salient regions within a video may be determined. Determining sizes of the salient regions within the video may include determining percentage of video frames of the video covered by the salient regions and/or number of pixels that depict the salient regions within the video frames of the video. At step 504, saliency frames within the video may be determined. Saliency frames within the video may be determined based on the sizes of salient regions within the video. Video frames with the sizes of salient regions satisfying one or more saliency criteria (e.g., percentage of video frames covered by the salient regions satisfying a threshold percentage, number of pixels that depict the salient regions within video frames satisfying a threshold number) may be determined to be saliency frames. At step 506, salient segments within the video may be determined. The salient segments within the video may be determined based on the saliency frames within the video. The salient segments within the video may be determined to include the saliency frames within the video. At step 508, a video edit may be generated. The video edit may be generated based on the salient segments. The video edit may be generated to include some or all of the salient segments.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
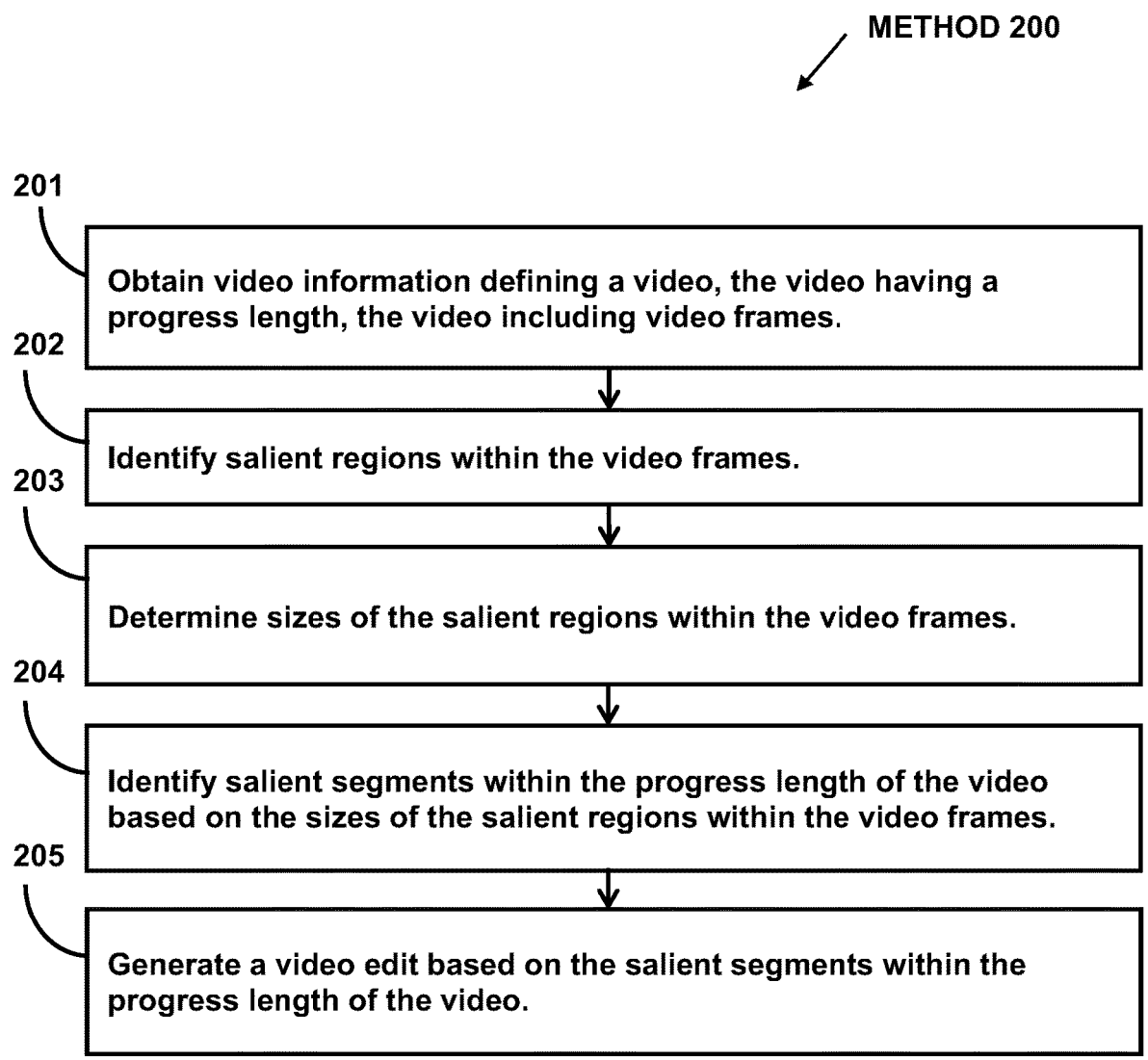
FIG. 2 illustrates a method for editing videos using saliency.

FIG. 2 illustrates method 200 for editing videos using saliency. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video. The video may have a progress length. The video may include video frames. In some implementations, operation 201 may be performed by a processor component the same as or similar to the video component 102 (Shown in FIG. 1 and described herein).

At operation 202, salient regions within the video frames may be identified. In some implementations, operation 202 may be performed by a processor component the same as or similar to the salient region component 104 (Shown in FIG. 1 and described herein).

At operation 203, sizes of the salient regions within the video frames may be determined. In some implementations, operation 203 may be performed by a processor component the same as or similar to the size component 106 (Shown in FIG. 1 and described herein).

At operation 204, salient segments within the progress length of the video may be identified based on the sizes of the salient regions within the video frames and/or other information. In some implementations, operation 204 may be performed by a processor component the same as or similar to the salient segment component 108 (Shown in FIG. 1 and described herein).

At operation 205, a video edit may be generated based on the salient segments within the progress length of the video and/or other information. In some implementations, operation 205 may be performed by a processor component the same as or similar to the video edit component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for editing videos using saliency, the system comprising:
   one or more physical processors configured by machine-readable instructions to:
      obtain video information defining a video, the video having a progress length, the video including video frames;
      identify salient regions within the video frames;
      determine sizes of the salient regions within the video frames;
      identify salient segments within the progress length of the video based on the sizes of the salient regions within the video frames, wherein identification of the salient segments within the progress length of the video based on the sizes of the salient regions within the video frames includes:
         identification of saliency frames among the video frames based on the sizes of the salient regions within the saliency frames satisfying a saliency criterion, wherein the saliency criterion is satisfied based on the sizes of the salient regions within the saliency frames covering a threshold percentage of the saliency video frames; and identification of the salient segments within the progress length of the video based on the saliency frames; and generate a video edit based on the salient segments within the progress length of the video.

2. The system of claim 1, wherein:

a given segment within the progress length of the video is identified based on inclusion of a threshold number of the saliency frames within the given segment; and a saliency score for the video is determined based on a number of the saliency frames identified within the video and a number of video frames within the video.

3. The system of claim 2, wherein the video edit is generated based on the salient segments within the progress length of the video based on the saliency score for the video.

4. The system of claim 1, wherein identification of the salient regions within the video frames is not performed for one or more of the video frames based on blurriness and/or shakiness of the one or more of the video frames.

5. A system for editing videos using saliency, the system comprising:

one or more physical processors configured by machine-readable instructions to:

obtain video information defining a video, the video having a progress length, the video including video frames;

identify salient regions within the video frames;

determine sizes of the salient regions within the video frames;

identify salient segments within the progress length of the video based on the sizes of the salient regions within the video frames, wherein identification of the salient segments within the progress length of the video based on the sizes of the salient regions within the video frames includes:

identification of saliency frames among the video frames based on the sizes of the salient regions within the saliency frames satisfying a saliency criterion; and identification of the salient segments within the progress length of the video based on the saliency frames; and generate a video edit based on the salient segments within the progress length of the video.

6. The system of claim 5, wherein the saliency criterion is satisfied based on the sizes of the salient regions within the saliency frames covering a threshold percentage of the saliency video frames.

7. The system of claim 5, wherein a given salient segment within the progress length of the video is identified based on inclusion of a threshold number of the saliency frames within the given salient segment.

8. The system of claim 7, wherein the given salient segment within the progress length of the video is identified further based on the saliency frames within the given salient segment being sequential video frames.

9. The system of claim 8, wherein the given salient segment within the progress length of the video is identified to include a first buffer before the saliency frames and/or a second buffer after the saliency frames.

10. The system of 5, wherein a saliency score for the video is determined based on a number of the saliency frames identified within the video and a number of video frames within the video.

11. The system of claim 10, wherein the video edit is generated based on the salient segments within the progress length of the video based on the saliency score for the video.

12. The system of 5, wherein identification of the salient regions within the video frames is not performed for one or more of the video frames based on blurriness and/or shakiness of the one or more of the video frames.

13. A method for editing videos using saliency, the method performed by a computing system including one or more processors, the method comprising:

obtaining, by the computing system, video information defining a video, the video having a progress length, the video including video frames;

identifying, by the computing system, salient regions within the video frames;

determining, by the computing system, sizes of the salient regions within the video frames;

identifying, by the computing system, salient segments within the progress length of the video based on the sizes of the salient regions within the video frames, wherein identifying the salient segments within the progress length of the video based on the sizes of the salient regions within the video frames includes:

identifying saliency frames among the video frames based on the sizes of the salient regions within the saliency frames satisfying a saliency criterion; and identifying the salient segments within the progress length of the video based on the saliency frames; and generating, by the computing system, a video edit based on the salient segments within the progress length of the video.

14. The method of claim 13, wherein the saliency criterion is satisfied based on the sizes of the salient regions within the saliency frames covering a threshold percentage of the saliency video frames.

15. The method of claim 13, wherein a given salient segment within the progress length of the video is identified based on inclusion of a threshold number of the saliency frames within the given salient segment.

16. The method of claim 15, wherein the given salient segment within the progress length of the video is identified further based on the saliency frames within the given salient segment being sequential video frames.

17. The method of claim 16, wherein the given salient segment within the progress length of the video is identified to include a first buffer before the saliency frames and/or a second buffer after the saliency frames.

18. The method of 13, wherein a saliency score for the video is determined based on a number of the saliency frames identified within the video and a number of video frames within the video.

19. The method of claim 18, wherein the video edit is generated based on the salient segments within the progress length of the video based on the saliency score for the video.

20. The method of 13, wherein identifying the salient regions within the video frames is not performed for one or more of the video frames based on blurriness and/or shakiness of the one or more of the video frames.

* * * * *